United States Patent [19]

Brady et al.

[11] 4,003,730

[45] Jan. 18, 1977

[54] APPARATUS FOR MAKING GLASS FIBERS

[75] Inventors: William C. Brady, Granville; Arthur S. Warner, Hebron; Harold D. Hankinson, Granville, all of Ohio

[73] Assignee: Owens-Corning Fiberglas Corporation, Toledo, Ohio

[22] Filed: Sept. 26, 1975

[21] Appl. No.: 616,973

[52] U.S. Cl. .................................. 65/1; 13/6; 65/11 W; 65/DIG. 4; 339/9 E
[51] Int. Cl.² .................................. C03B 37/02
[58] Field of Search ............... 65/1, 2, 12, DIG. 4; 13/6, 25; 339/9 R, 9 E

[56] References Cited

UNITED STATES PATENTS

| | | | |
|---|---|---|---|
| 1,588,556 | 6/1926 | Thompson | 339/9 E |
| 1,759,567 | 5/1930 | Dibner | 339/9 E |
| 2,542,669 | 2/1951 | Harrison | 339/9 E X |
| 3,111,550 | 11/1963 | Rushtow | 65/DIG. 4 |
| 3,511,916 | 5/1970 | Sinclair et al. | 13/6 X |
| 3,912,477 | 10/1975 | Brady et al. | 65/1 |

*Primary Examiner*—Robert L. Lindsay, Jr.
*Attorney, Agent, or Firm*—John W. Overman; Ronald C. Hudgens; Ted C. Gillespie

[57] ABSTRACT

A heating unit for converting batch mineral material to molten glass is disclosed. The unit includes a receptacle for the flowable material, heating elements for supplying heat to the flowable material, and movably mounted bus bars for supplying electrical energy to the heating elements, where the bus bars are movable to accommodate the expansion and contraction of the heating elements.

19 Claims, 6 Drawing Figures

— 4,003,730 —

APPARATUS FOR MAKING GLASS FIBERS

BACKGROUND OF THE INVENTION

Numerous furnace designs have been utilized to melt high-temperature fusing mineral material into a heat-softened body. One common design for glass utilizes a curved sheet-like metal current-conducting heater element across a melting chamber. See, for example, U.S. Pat. No. 3,264,076. When high amperage electrical current passes through the sheet-like heating element, the heat from the energized element continuously converts input mineral material into molten glass. When the heating arrangement utilizes the melter to supply molten material to a feeder or other apparatus, as shown in U.S. Pat. No. 3,264,076, the heater element is generally oriented across the direction of flow of the molten material towards the outlet to the feeder or other apparatus.

A later melter design, as described in U.S. Pat. No. 3,912,477, provides for increased output or "throughput" by utilizing a bank of spaced parallel "rod-type" heating elements submerged in a body of flowable material in the receptacle. The shapes of the rod-type heating elements described in the above patent application allow greater surface content between the heating elements and the flowable material, thus permitting greater heat transfer and consequently greater throughput. The heating elements in the above patent are rigidly mounted in parallel between two bus bars which supply electrical energy, and the heating elements are made with a refractory core and a thin conductive metal outer coating. This construction allows considerable conservtion of precious high-temperature metals, with a maximum of heat transfer.

One of the heretofore unsolved problems of glass melting furnaces is the problem of expansion of the heating elements caused by the high operating temperatures of the melter. These temperatures may be as high as 1700° C. This problem is particularly acute in the increased throughput "rod-type" heating units. The heating elements are prevented from expanding in the "rod-type" heater because they are rigidly connected to the bus bars, which in turn are rigidly bolted directly to the transformer supplying power to the heating elements. In order to expand, the heating elements must deform. This deformation can lead to premature failure of the heating elements, especially if they are cycled up and down in temperature due to power failures or unit shut-down for cleaning. Premature failure of heating elements results in increased material costs and lower overall production output.

SUMMARY OF THE INVENTION

An object of the invention is an improved melter using a heating element for converting batch mineral material into molten glass. One can obtain the above and other objects by the use of the present invention, which provides for a freemoving bus bar allowing it to move to accommodate the thermal contraction and expansion of the heating elements.

Other objects and advantages of the invention will become apparent as the invention is described hereinafter in more detail with reference made to the accompanying drawings.

DESCRIPTION OF THE PREFERRED EMBODIMENTS

While particular use of this invention may be found for manufacturing glass filaments, one may use the principles of this invention in processing flowable and heat-softenable materials generally. A glass filament forming apparatus is used only for purposes of explaining the operation of the invention.

Figure 1:
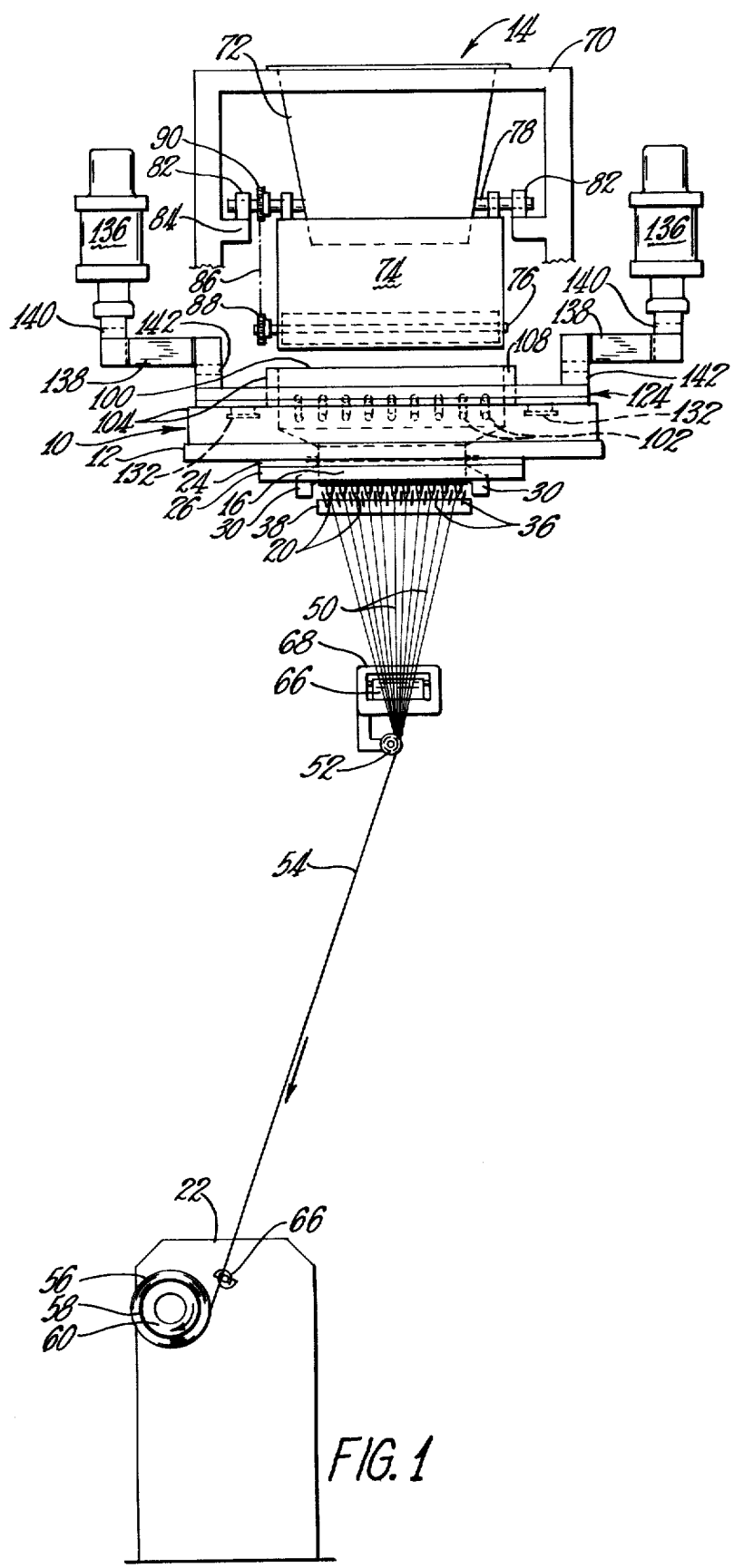
FIG. 1 is a front elevation view of apparatus for producing continuous filament glass strand according to the principles of this invention.
Figure 2:
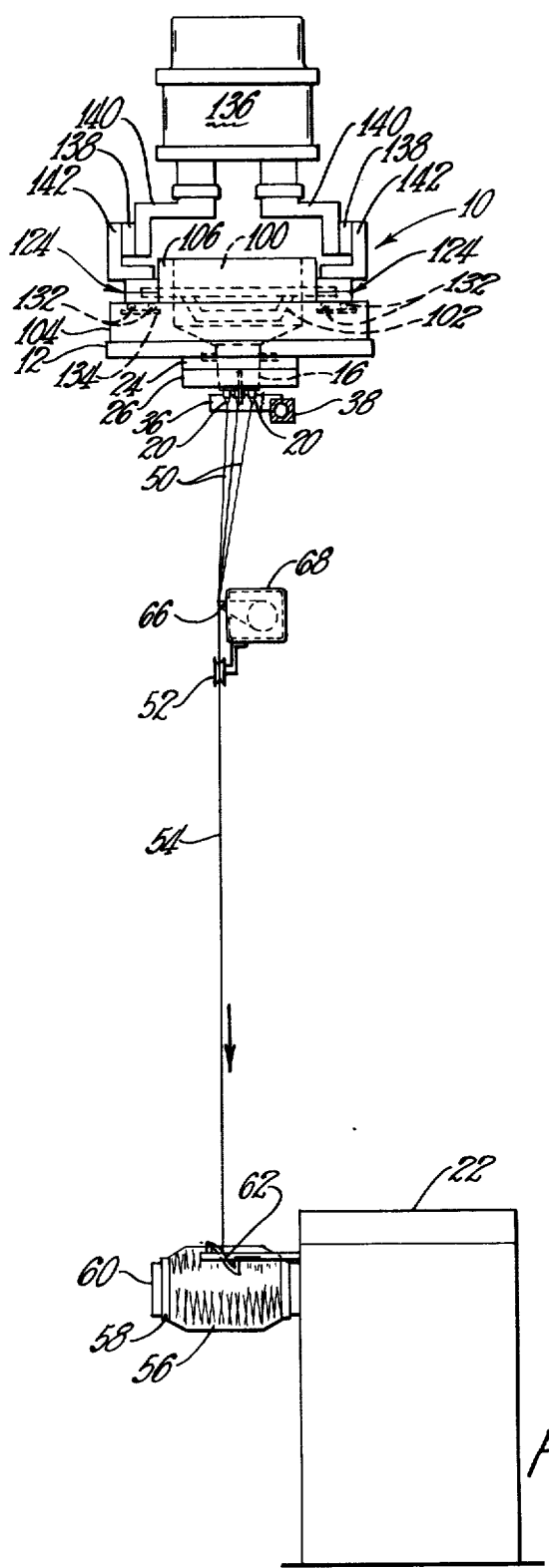
FIG. 2 is a side elevation view of the apparatus illustrated in FIG. 1.
Figure 3:
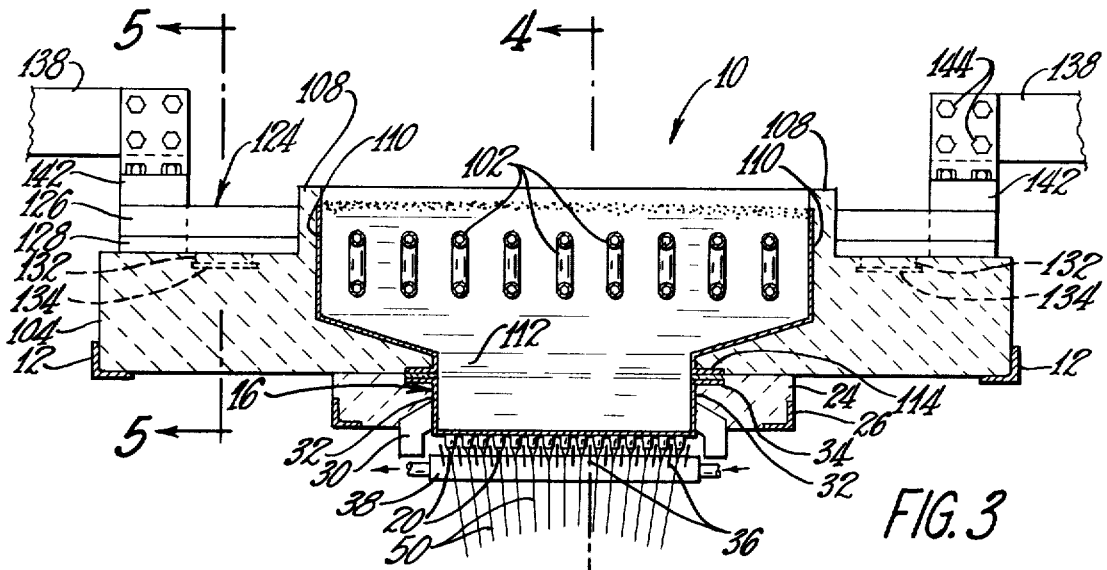
FIG. 3 is a longitudinal sectional view of a melter and feeder arrangement according to the principles of the invention used in the apparatus shown in FIGS. 1 and 2.
Figure 4:
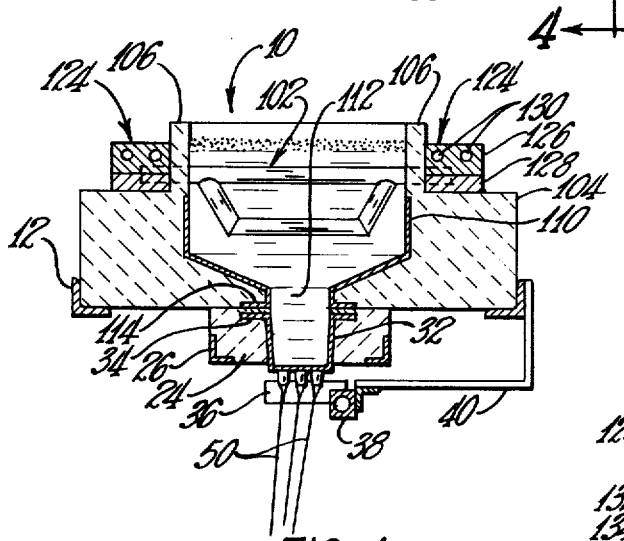
FIG. 4 is a transverse section view taken substantially on the line 4—4 of FIG. 3.

FIGS. 1 and 2 show apparatus operating to receive glass in batch form and to produce continuous glass strand that is collected as a wound package. As illustrated the melting assembly 10 is supported by a frame 12. Batch material is fed into the melting assembly 10 by the batch supply apparatus 14. The melting assembly 10 discharges molten glass into the feeder or bushing 16 from which flow molten glass streams 20. A winder 22 attenuates the molten glass. The feeder 16 is surrounded on the sides by a refractory insulation material 24 which is supported by an angle frame 26. The feeder 16 is electrically resistance heated by energy distributed through the terminals 30. As shown in FIGS. 3 and 4 the feeder 16 has walls 32 made of a material such as a platinum rhodium alloy which will not deteriorate appreciably under the high operating temperatures of the feeder 16. The walls 32 terminate in a flange 34 at their upper edges, as shown in FIGs. 3 and 4.

The glass streams 20 are cooled by fins 36 eminating from a water-cooled manifold 38. The manifold system is held in place by a support 40, as shown in FIG. 4.

The winder 22 attenuates the molten glass streams 20 into continuous glass filaments 50. The gathering shoe 52 combines the advancing continuous glass filaments 50 into a glass strand 54. The winder 22 winds the strand 54 as a package 56 on a suitable collector such as a tubular collector 58 telescoped onto a collet 60. The winder 22 drives the collet 60 in rotation. A reciprocatable and rotatable strand traversing means 62 reciprocates the advancing strand 54 lengthwise of the collecting tube 58 to distribute the strand 54 on the strand package 56.

An applictor 66 supported within a housing 68 applies sizing liquid or other coating material to the advancing filaments 50 as shown in FIG. 1. The applicator 66 may be any suitable means known to the art such as an endless belt that moves to pass through a sizing liquid or other coating material held in the housing 68. As the filaments 50 travel across the surface of the moving applicator 66, some of the sizing liquid or other coating material on the applicator 31 transfers to the filaments 50.

The batch supply apparatus 14 is supported by a frame 70 and consists of a batch supply hopper 72 with a supply of batch mineral material in comminuted form and a supplemental hopper 74. A finned shaft 76 meters and regulates the batch mineral material into the melting assembly 10. The supplemental hopper 74 is supported by a shaft 78 held in journal bearings 82 carried by cross members 84 on the frame 70. A chain 86 and sprockets 88 and 90 drive the shaft 76 in harmony with the rotation of the shaft 78. The shaft 78 is driven by an electric motor, not shown. One may control the rate of delivery of batch material from the supplemental hopper 74 into the melting assembly 10 by varying the speed of rotation of the shaft 78 and thereby the shaft 76. A more complete description of the batch feeding process may be found by referring to U.S. Pat. No. 3,264,076.

The melting assembly 10 includes a melting receptacle or melter 100 in which batch mineral material is converted into molten glass by heat from the spaced apart heating elements or rods 102. The melter 100 is surrounded on all sides by a high-temperature resistant refractory material 104 to reduce heat loss from the molten glass in the melter. The refractory material includes lengthwise extending sidewalls 106 and transversely extending endwalls 108.

The melter walls are lined with a liner 110, which conforms to the interior arrangement of the refractory structure 104. In order that the liner 110 be prevented from deteriorating appreciably under the high melting temperatures present during normal melter operation, the liner 110 is normally made of platinum or a platinum alloy such as an alloy containing a substantial percentage of rhodium. It is possible to use other high-temperature resistant materials for the liner 110.

The liner 110 is not electrically energized, and it is separated electrically from electrical circuits and supplies. As shown in FIGS. 3 and 4 the lower portion of the liner 110 defines a narrowed passageway 112, and terminates at its lower portion with flanges 114. The liner 110 and flanges 114 are electrically insulated by the refractory 24 from the feeder 16 and its walls 32 and flanges 34, as shown in FIGS. 3 and 4.

Figure 6:
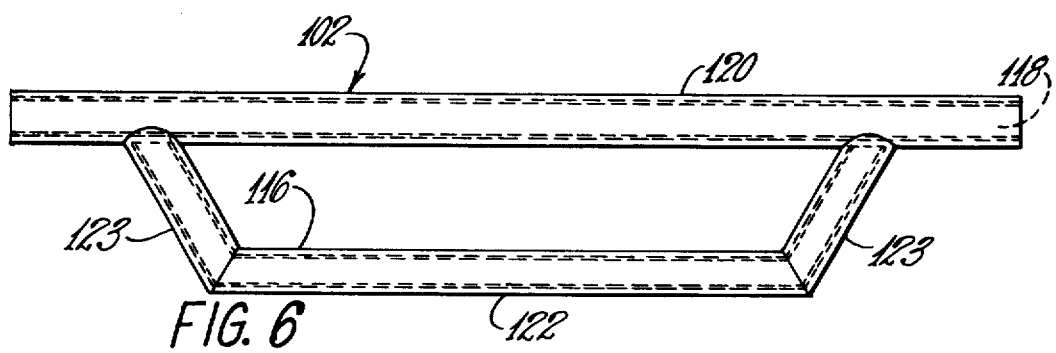
FIG. 6 is an enlarged front elevation view of one of the heating elements shown in FIGS. 3 and 4.

The heating elements 102 are similar to those disclosed in the U.S. patent application Ser. No. 514,545. In the preferred embodiment as shown in FIG. 6, the heating elements 102 are made of hollow metal "skins" or tubes 116 which surround a cylindrical refractory rod interior 118. The refractory rod 118 provides support for the metal exterior 116 and is made of aluminum oxide or a similar refractory material. The exterior surface 116 is of a high-temperature resistant metal which is electrically conductive. The heating elements 102 are subject to expansion and contraction upon heating and cooling.

In order to provide for efficient heating of the glass as it flows vertically downward in between the heating elements 102, the depth of each heating element is appreciably greater than its width. This is accomplished by splitting the central portion of the heating element 102 into two spaced apart parallel straight middle elements, the upper middle element 120 and the lower middle element 122, which are joined by end portions 123. This dividing of the heating element 102, as shown in FIG. 6, provides two distinct current paths, one through each of the middle elements 120 and 122.

Figure 5:
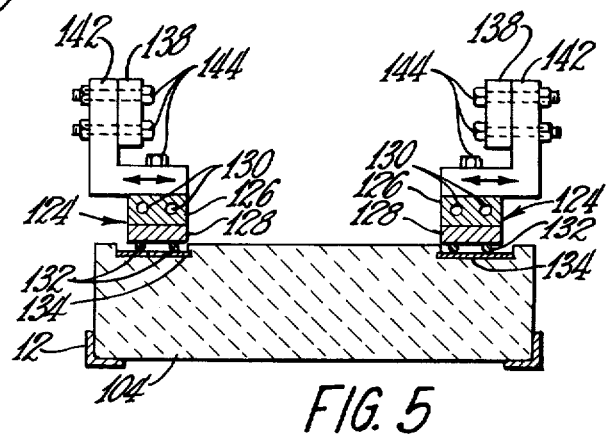
FIG. 5 is a transverse section view taken substantially on the line 5—5 of FIG. 3.

The heating elements 102 positioned beneath the surface of the molten glass in the upper portion of the melter 100 are attached at each end to the bus bars 124. Each bus bar 124 is comprised of an upper bus bar member 126 and a lower bus bar member 128. In the preferred embodiment the upper and lower members 126 and 128 are clamped together over the ends of the heating element 102. The upper bus bar member 126 is provided with passageways 130 for a cooling fluid, as shown in FIGS. 4 and 5. The cooling of the bus bars 124 is desirable in order to prevent the soft conductive metal of the bus bars 124 from melting or deforming.

The heating elements 102 are generally arranged in parallel and are generally perpendicular to the bus bars 124. The heating elements 102 are so attached to the bus bars 124 that the longitudinal force of thermal expansion of the heating elements 102 is directly transmitted to the bus bars 124. The bus bars 124 are free to move in either direction along an axis parallel to the longitudinal axes of the heating elements 102. The direction of movement is shown by the arrows in FIG. 5. In the preferred embodiment the heating elements 102 are rigidly attached to the bus bars 124. Other means of attachment are possible, such as a flexible means, provided that the forces of longitudinal expansion of the heating elements are transmitted to the bus bars 124.

In the preferred embodiment, as shown in FIG. 5, the bus bars 124 are movable on cylindrical rollers 132 which roll on a metal pad 134. The pad 134 is supported by the melter refractory 104. Although in the preferred embodiment, as shown in FIGS. 2 and 5, both bus bars 124 are freemoving, other embodiments may have one bus bar fixed and the other bus bar freemoving. In such a case the one movable bus bar would move to compensate for the entire amount of longitudinal expansion of the heating elements 102. Other methods besides the roller 132 shown in the preferred embodiment may be used to provide free movement of the movable bus bars 124. For example, the bus bar 124 may be positioned on a pair of longitudinal pistons or rods which move within a hollow bore.

The current passing through the bus bars 124 and heating elements 102 is supplied from transformers 136. The electrical supply for the bus bars 124 is separate from the electrical supply for the feeder 16. The amount of electrical energy passing through the heating elements from the transformers is regulated by a suitable control circuit, as more fully described in U.S. patent application Ser. No. 514,545. The connection between the bus bars 124 and the transformers 136 is provided by a flexible bar 138 and rigid angle members 140 and 142. The bus connector pieces 138, 140 and 142 are made of copper, although some other suitable electrically conductive material could be used. The angle members 140 and 142 are more clearly shown in FIGS. 2, 3 and 5. Angle member 140 is securely bolted to the transformer 136 and the flexible bar 138 with bolts (not shown). Angle member 142 is securely bolted to the flexible bar 138 and the bus bar 124 with bolts 144 as shown in FIGS. 3 and 5.

The flexible bar member 138 is comprised of a collection of thin copper sheets. The sheets are sandwiched together to provide a laminar construction. Each individual sheet of the bar member 138 is thin enough to be flexible. The entire bar member 138 may thus bend, and absorb the expansion of the heating elements 102 as transmitted through the movable bus bar 124 and the rigid bus connector piece 142. The deflection of the flexbile bar member 138 has no appreciable effect on its electrical current-carrying capabilities.

While the preferred embodiment utilizes a flexible bus bar of flexible copper sheets, other flexible connector means may be used. For example, a flexible current-carrying cable may also be used as the connector between the stationary transformers 136 and the movable bus bars 124. Other connectors, not necessarily flexible, could also be utilized, as long as there is a continuous electrical connection between the stationary transformers 136 and the movable bus bar 124.

While the embodiment shown in FIGS. 1 through 6 utilizes the rod-type heating elements 102, the principles of this invention also apply to earlier furnace designs, such as found in U.S. Pat. No. 3,264,076 which utilizes a curved sheet-like metal screen. Such a screen may be attached on opposite ends to a bus bar which is movable to reflect the expansion and contraction of the metal heating screen. The movable bus bar would then be connected to the transformer through a flexible connection or some other expansion absorbing means.

We claim:

1. Apparatus for producing molten glass streams in fiber-forming condition comprising:
    a walled melting receptacle of high-temperature resistant material having at least a partially open top and a partially open bottom and in which molten glass is formed from batch material;
    a feeder communicating with the melting receptacle through the bottom opening in the melting receptacle, molten glass formed in the melting receptacle flowing from the melting receptacle through the bottom opening into the feeder, the bottom of the feeder having holes through which the molten glass flows as molten streams;
    a heating element extending across the interior of the receptacle and having opposite edge portions, the heating elements being electrically conductive and being positioned to be beneath the surface of a body of molten glass formed within the receptacle, and the heating element being subject to changes in its dimensions when heated;
    a pair of bus bars for distribution of electrical energy effective to heat the heating element to form molten glass from the batch material, each bus bar being connected to an edge portion of the heating element;
    a mounting means holding the bus bars so that at least one of the bus bars is movable to accommodate the dimensional changes in the heating element; and
    means for providing electrical power to the bus bars.

2. Apparatus according to claim 1 in which the heating element is comprised of a longitudinal member having an elongated central portion including two spaced apart parallel straight cylindrical portions and shorter end portions connecting the straight portions to each other, the straight portions being in a plane oriented generally vertically.

3. Apparatus for producing molten glass streams in fiber-forming condition comprising:
    a walled melting receptacle of high-temperature resistant material having at least a partially open top and a partially open bottom and in which molten glass is formed from batch material;
    a feeder communicating with the melting receptacle through the bottom opening in the melting receptacle, molten glass formed in the melting receptacle flowing from the melting receptacle through the bottom opening into the feeder, the bottom of the feeder having holes through which the molten glass flows as molten streams;
    a longitudinal heating element extending across the interior of the receptacle, the heating element being electrically conductive and being positioned to be beneath the surface of a body of molten glass formed within the receptacle, and the heating element being subject to changes in its longitudinal dimension when heated;
    a pair of bus bars which electrically connect the heating element for distribution of electrical energy effective to heat the heating element to form molten glass from the batch material;
    mounting means holding the bus bars so that at least one of the bus bars is movable along an axis parallel to the longitdudinal axis of the heating element to accommodate changes in the longitudinal dimension of the heating element; and
    means for providing electrical power to the bus bars.

4. Apparatus according to claim 3 in which the mounting means for each movable bus bar is comprised of rollers to effect movement along an axis parallel to the longitudinal axis of the heating element.

5. Apparatus according to claim 3 in which the means for providing electrical power to each movable bus bar is flexible.

6. Apparatus according to claim 3 in which there is an electrical means effective to heat the feeder, where such means is electrically separate from the means providing electrical power to the bus bars.

7. Apparatus according to claim 6 in which there is a means for attenuating the molten glass streams into continuous glass filaments.

8. Apparatus according to claim 3 in which the bus bars are generally perpendicular to the longitudinal axis of the heating element.

9. Apparatus according to claim 3 in which there is a means mounted above the melting receptacle for supplying batch mineral material to the melting receptacle.

10. Apparatus for producing molten glass streams in fiber-forming condition comprising:
    a walled melting receptacle of high-temperature resistant material having at least a partially open top and a partially open bottom, and in which molten glass is formed from batch material in the receptacle;
    a feeder communicating with the melting receptacle through the bottom opening in the melting receptacle, molten glass formed in the melting receptacle flowing from the melting receptacle through the bottom opening into the feeder, the bottom of the feeder having holes through which the molten glass flows as molten streams;
    a plurality of adjacent longitudinal heating elements extending across the interior of the receptacle from opposite walls of the receptacle, the heating elements being electrically conductive and being positioned to be beneath the surface of a body of molten glass formed with the receptacle, and the heating elements being subject to changes in their longitudinal dimension when heated;
    a pair of bus bars which electrically connect the heating elements in parallel for distribution of electrical energy effective to heat each heating element to form molten glass from the batch material, the bus bars being generally perpendicular to the longitudinal axes of the heating elements;

mounting means holding the bus bars so that at least one of the bus bars is movable along an axis parallel to the longitudinal axes of the heating elements to accommodate the dimensional changes in the heating elements;

means for providing electrical power to the bus bars; and means for delivering batch mineral material in comminuted form to the receptacle through the opening in the top of the receptacle.

11. Apparatus according to claim 10 in which the mounting means for each movable bus bar is comprised of rollers to effect movement along an axis parallel to the longitudinal axis of each heating element.

12. Apparatus according to claim 10 in which the means for providing electrical power to each movable bus bar is flexible.

13. Apparatus according to claim 10 in which there is an electrical means effective to heat the feeder, where such means is electrically separate from the means providing electrical power to the bus bars.

14. Apparatus according to claim 13 in which there is a means for attenuating the molten glass streams into continuous glass filaments.

15. Apparatus according to claim 10 in which all of the heating elements are parallel.

16. Apparatus according to claim 15 in which each heating element includes a hollow outer electrical current-conducting portion and heat-resistant material within the outer portion.

17. Apparatus according to claim 16 in which each heating element has an appreciable depth compared to its thickness and is oriented with its depth dimension extending in the direction of flow of molten glass from the receptacle to the feeder.

18. Apparatus according to claim 17 in which each element has an elongated central portion including two spaced apart parallel straight cylindrical portions, and shorter end portions connecting the straight portions to each other, the two straight portions being in a plane oriented generally vertically.

19. Apparatus for producing continuous glass filaments comprising:

a walled melting receptacle of high-temperature resistant material having at least a partially open top and a partially open bottom, and in which molten glass is formed from batch material in the receptacle;

a feeder communicating with the melting receptacle through the bottom opening in the melting receptacle, molten glass formed in the melting receptacle flowing from the melting receptacle through the bottom opening into the feeder, the bottom of the feeder having holes through which the molten glass flows as molten streams;

a plurality of adjacent parallel longitudinal heating elements extending across the interior of the receptacle from opposite walls of the receptacle, the heating elements being electrically conductive and being positioned to be beneath the surface of a body of molten glass formed within the receptacle, and each heating element having appreciable depth compared to its thickness, and being oriented with its depth dimension extending in the direction of flow of molten glass, and each heating element being subject to changes in its longitudinal dimension when heated;

a pair of bus bars at the upper edge region of the melting receptacle which electrically connect the heating elements in parallel for distribution of electrical energy effective to heat each heating element to form molten glass from the batch material, the bus bars being generally perpendicular to the longitudinal axes of the heating elements;

a mounting means holding the bus bars so that at least one of the bus bars is movable on rollers along an axis parallel to the longitudinal axes of the heating elements to accommodate the dimensional changes in the heating elements;

a flexible means for providing electrical power to the bus bars;

means for delivering batch mineral material in comminuted form to the receptacle through the opening in the top of the receptacle; and means for attenuating the molten glass streams into continuous glass filaments.

* * * * *